United States Patent
Valensa

(10) Patent No.: US 9,255,746 B2
(45) Date of Patent: Feb. 9, 2016

(54) REACTOR CORE FOR USE IN A CHEMICAL REACTOR, AND METHOD OF MAKING THE SAME

(71) Applicant: Modine Mfg. Co., Racine, WI (US)

(72) Inventor: Jeroen Valensa, Muskego, WI (US)

(73) Assignee: Modine Manufacturing Company, Racine, WI (US)

( * ) Notice: Subject to any disclaimer, the term of this patent is extended or adjusted under 35 U.S.C. 154(b) by 260 days.

(21) Appl. No.: 13/661,079

(22) Filed: Oct. 26, 2012

(65) Prior Publication Data

US 2014/0120007 A1 May 1, 2014

(51) Int. Cl.
| | |
|---|---|
| *B01J 8/02* | (2006.01) |
| *F28F 1/32* | (2006.01) |
| *F28D 7/08* | (2006.01) |
| *F28F 9/26* | (2006.01) |
| *F28D 21/00* | (2006.01) |

(52) U.S. Cl.
CPC ... *F28F 1/32* (2013.01); *B01J 8/02* (2013.01); *F28D 7/087* (2013.01); *F28D 2021/0022* (2013.01); *F28F 9/26* (2013.01); *F28F 2275/04* (2013.01); *F28F 2275/125* (2013.01); *Y10T 29/49345* (2015.01)

(58) Field of Classification Search
CPC .......................................................... B01J 8/02
USPC .................... 422/600, 602, 200, 198; 518/700
See application file for complete search history.

(56) References Cited

U.S. PATENT DOCUMENTS

| | | | | | |
|---|---|---|---|---|---|
| 3,221,399 | A | * | 12/1965 | Karmazin | ................ 29/890.036 |
| 6,916,453 | B2 | * | 7/2005 | Filippi et al. | .................. 422/198 |
| 7,269,966 | B2 | * | 9/2007 | Lowenstein et al. | ............ 62/271 |
| 7,648,686 | B2 | | 1/2010 | Reinke et al. | |
| 7,749,466 | B2 | | 7/2010 | Vitucci et al. | |
| 8,246,915 | B2 | | 8/2012 | Boer et al. | |
| 2003/0070963 | A1 | * | 4/2003 | Zimmermann et al. | ....... 208/106 |
| 2005/0061492 | A1 | * | 3/2005 | Kurihara et al. | ............... 165/150 |
| 2006/0102321 | A1 | * | 5/2006 | Shincho et al. | ................. 165/81 |
| 2010/0240780 | A1 | * | 9/2010 | Holcombe | .................... 518/712 |
| 2010/0324158 | A1 | | 12/2010 | Bowe et al. | |

* cited by examiner

*Primary Examiner* — Walter D Griffin
*Assistant Examiner* — Huy-Tram Nguyen
(74) *Attorney, Agent, or Firm* — Michael Best & Friedrich LLP

(57) ABSTRACT

A reactor core for use in a chemical reactor includes first and second reactor core sections. Each core section includes heat transfer fluid conduits extending through the core section in a first direction, the lengths of the conduits defining a core section width. Each core section further includes spaced apart parallel plates arranged into a plate stack, with the conduits extending through the stack. Surfaces of the plates have a catalyst coating applied to them. The plates are rectangular and define a core section depth and a core section length, the core section depth being substantially smaller than both the core section width and length. Channels are defined by the spaces between adjacent plates, and are open to flow through the reactor core section in both the core section depth and length directions. The first core section is adjacent to the second core section in the depth direction.

18 Claims, 6 Drawing Sheets

REACTOR CORE FOR USE IN A CHEMICAL REACTOR, AND METHOD OF MAKING THE SAME

STATEMENT REGARDING FEDERALLY SPONSORED RESEARCH AND DEVELOPMENT

This invention was made with Government support under FAR8650-09-D-5601 awarded by the United States Department of Defense. The Government has certain rights in the invention.

BACKGROUND

Chemical reactors to at least partially convert a reactant flow stream into a product flow stream by promoting chemical reactions between the constituents of the reactant flow stream are known. The reactant flow stream is typically pre-conditioned to a suitable temperature and pressure for favoring the desired chemical reactions, and is subsequently routed through the chemical reactor, wherein the reactants are placed into contact with suitable catalysts to promote those chemical reactions.

These chemical reactions are oftentimes exothermic, although in some cases the reactions can be endothermic. At the same time, the reactions are often highly sensitive to the reaction temperature. It can be beneficial for the heat that is produced (or consumed, in the case of endothermic reactions) by the reaction to be removed from (or provided to, in the case of endothermic reactions) the reaction surfaces directly, rather than in a separate heat exchanger downstream of the reactor. The benefits that can be achieved by doing so include higher throughput of reactants and better selectivity of the reaction, among others.

A prime example of such a chemical reaction is the Fischer-Tropsch reaction, whereby carbon monoxide and hydrogen are reacted over a catalyst (typically Cobalt) to produce long hydrocarbon chains, which can subsequently be turned into liquid fuel. This reaction is exothermic, and heat needs to be removed from the reaction as it occurs in order to maintain a constant temperature. At large scales, Fischer-Tropsch reactors are usually slurry bubble reactors, wherein the catalyst consists of small particles suspended in a slurry. The gaseous reactants bubble up through the slurry, reacting as the bubbles contact the catalyst.

Due in part to the decreasing costs of natural gas (which can provide the feedstock chemicals for the reactions) coupled with the increasing cost and scarcity of liquid fuels, the desirability of producing fuel via the Fisher-Tropsch process is increasing. However, oftentimes the production rate of the feedstock fuel is insufficient to support the large cost associated with conventional, large scale Fisher-Tropsch reactors. Transporting the natural gas feedstock to a centralized location for processing is often impractical or economically prohibitive. As a result, much attention is now focused on process-intensified reactors to enable the economic production of Fischer-Tropsch fuels at a substantially smaller scale than can be achieved using the aforementioned conventional technology.

While such small scale Fischer-Tropsch reactors have been demonstrated, there is still much room for improvement. Such small scale reactors typically include long channels containing catalyst, through which the reactants flow and react to form a paraffinic wax. The reactant flow is typically in the direction of gravity, so that the wax can drip down out of the channels. It is preferential to have many channels with small hydraulic diameters in order to decrease the resistance to mass transfer and heat transfer. A coolant (boiling water, for example) flows through coolant channels in the reactor in order to absorb the heat of reaction and maintain a near-isothermal temperature.

One challenge in constructing such a small-scale reactor is that it can be difficult to place the required catalyst in a long channel. The typical approach is to apply the catalyst as a coating to inserts that are then placed into the long channels. Such an approach is described in U.S. Pat. No. 7,749,466 and US patent application 2010/0324158. This approach has several disadvantages, including the need to handle multiple parts (thereby adding cost), as well as the lack of good thermal contact between the catalyzed surfaces and the channel surfaces through which the heat must be transferred.

An alternative approach is disclosed in U.S. Pat. No. 8,278,363. In that approach, the reactor includes multiple compact finned-tube heat exchangers, each of which are coated with catalyst on the external finned surfaces. The heat exchangers are arranged in series with respect to the reactant flow, and cooling water is separately plumbed to each heat exchanger. However, since the depth to which the catalyst coating can be applied is relatively shallow, and the flow length is relatively long, this approach can require a great number of heat exchangers. For example, the depth to which the catalyst coating can be applied is typically in the range of 1-2 inches, whereas the desired flow length is typically in the range of 30-50 inches.

SUMMARY

According to an embodiment of the invention, a reactor core for use in a chemical reactor includes first and second reactor core sections. Each of the core sections includes a plurality of heat transfer fluid conduits extending through the core section in a first direction, with the lengths of the fluid conduits defining a core section width. Each core section further includes spaced apart parallel plates arranged into a plate stack, with the fluid conduits extending through the plate stack. Surfaces of the plates have a catalyst coating applied to them. The plates are rectangular and define a core section depth and a core section length, with the core section depth being substantially smaller than both the core section width and the core section length. Channels are defined by the spaces between adjacent plates, and are open to flow through the reactor core section in both the core section depth direction and the core section length direction. The first reactor core section is arranged adjacent to the second reactor core section in the core section depth direction.

In some embodiments, the heat transfer fluid conduits of the first reactor core section are hydraulically in parallel with the heat transfer fluid conduits of the second reactor core section.

In some embodiments, the plates include flanged holes to receive the heat transfer fluid conduits. The flanges provide thermal contact between the fluid conduits and the plates. In some such embodiments the flanges define the spacing between the plates.

In some embodiments, the first and second reactor core sections are two of a plurality of reactor core sections that are arranged in a core section stack extending in the core section depth direction.

According to another embodiment of the invention, a reactor core for use in a chemical reactor has an inlet face to receive a reactant flow, and an exit face parallel to and spaced apart from the inlet face to discharge a product flow. The distance between the inlet face and the exit face defines a core flow length. Spaced apart, parallel arranged plates extend from the inlet face to the exit face, and have a catalyst applied to surface of the plates to promote a chemical reaction in the reactant flow. A heat transfer circuit includes a plurality of heat transfer fluid conduits extending through the plates. The conduits are in heat transfer contact with the plates to facilitate the transfer of heat between the catalyzed surfaces and a fluid passing through the heat transfer circuit.

In some embodiments, the reactor core includes multiple core sections arranged adjacent to one another in a reactor core depth direction perpendicular to the flow length. In some such embodiments the fluid conduits extend in a reactor core width direction perpendicular to the reactor core depth direction. In some embodiments the heat transfer circuit includes multiple circuit segments that are fluidly in parallel, and each one the core sections contains one of the circuit segments.

In some embodiments, the reactor core includes a baffle plate at the inlet face to direct the reactant flow through the inlet face. In some such embodiments the plates and the heat transfer circuit are structurally supported from the baffle plate.

According to another embodiment of the invention, a method of manufacturing a reactor core for use in a chemical reactor is provided. The method includes providing a first core section having a relatively short dimension and a relatively long dimension, and providing a second core section having a relatively short dimension and a relatively long dimension. A catalyst coating is applied to outer surfaces of the first and the second core sections. The core sections are stacked in a direction corresponding to the relatively short dimension, and are arranged into a reactor vessel so that the relatively long dimension is aligned with a reactant flow direction through the reactor vessel. In some embodiments, additional core sections are provided and are catalyst coated and stacked with the first and second sections.

In some embodiments, applying a catalyst coating includes oxidizing outer surfaces of the core section, coating the oxidized surfaces with a wash coat of a slurry containing a catalyst, and blowing off excess slurry in a direction corresponding to the relatively short dimension. In some such embodiments the surfaces are coated by dipping the core section into the slurry.

In some embodiments, providing a core section includes producing a pattern of flanged holes in a plurality of thin, flat plates, arranging the plates into a plate stack by aligning the holes of each plate, inserting lengths of tubing through the aligned holes, and joining the lengths of tubing to the plates to provide thermal contact. In some such embodiments the lengths of tubing are joined to the plates by mechanically expanding the tubing. In other embodiments the lengths of tubing are joined to the plates by creating braze joints.

In some embodiments, the catalyst coating includes a catalyst capable of catalyzing Fisher-Tropsch reactions.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
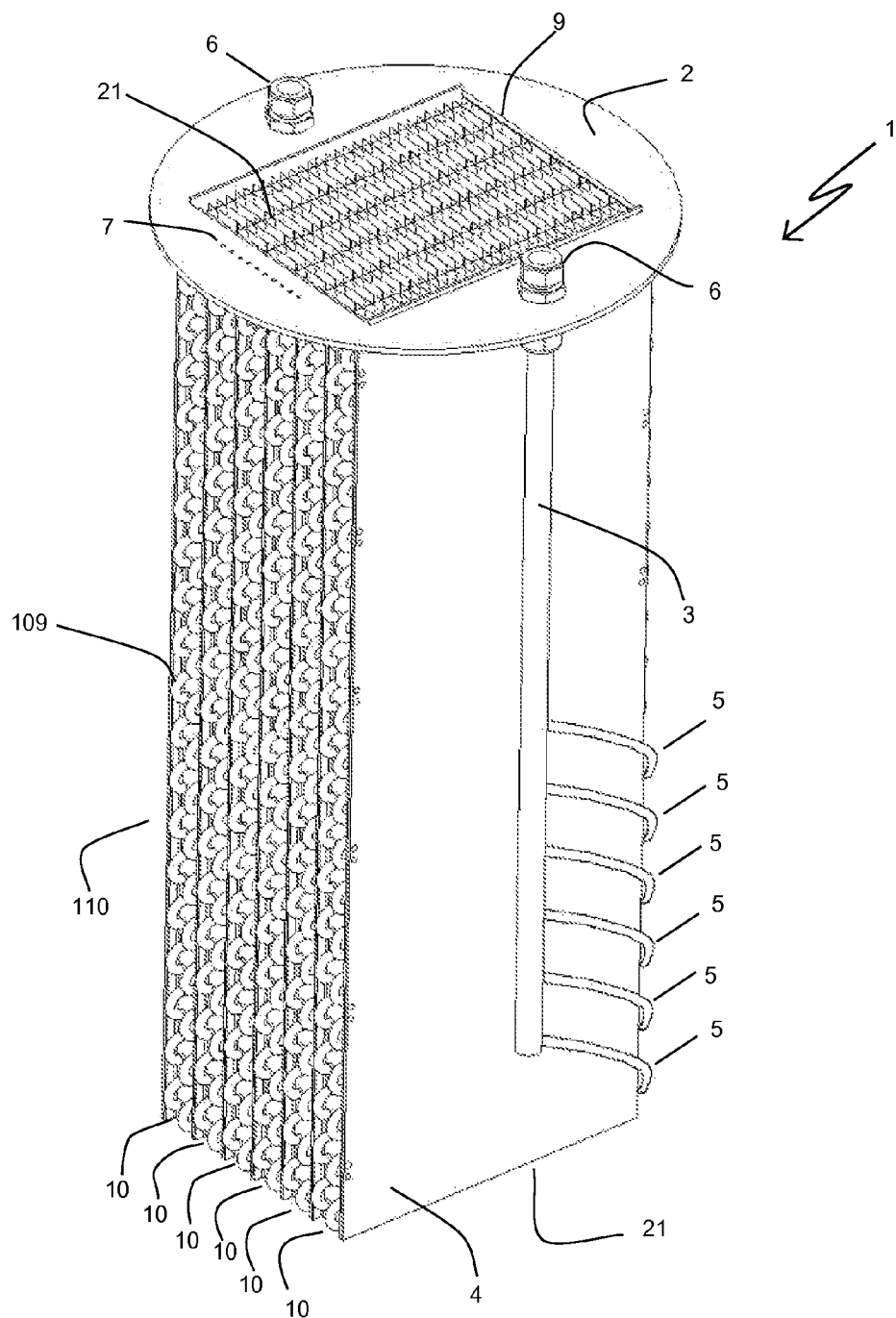
FIG. 1 is a perspective view of a reactor core according to an embodiment of the present invention.

A reactor core 1 according to an embodiment of the present invention is illustrated in FIG. 1. The reactor core 1 includes multiple core sections 10, arranged into a prismatic core section stack 110. The exemplary embodiment has six of the core sections 10 arranged to form the core section stack 110, but it should be understood that fewer or more core sections 10 can be included. A heat transfer fluid circuit 109 extends through the reactor core 1 in order to remove heat generated by exothermic chemical reactions from the reactor core 1. In some alternative embodiments the heat transfer fluid circuit 109 can be used to provide heat for endothermic chemical reactions to the reactor core 1.

The reactor core 1 further includes a baffle plate 2 arranged at an end of the core section stack 110. The baffle plate 2 provides a circular periphery for use in a circular reactor vessel 106 (shown in FIG. 7). A rectangular aperture 9 is centrally located in the baffle plate 2 and conforms to the area of a face 20 of the core section stack 110. Fluid couplings 6 are secured to the baffle plate 2 and provide an inlet and an outlet for the heat transfer fluid circuit 109. One of the fluid couplings 6 connects to an inlet manifold 3 arranged alongside the core section stack 1. Multiple feed lines 5 extend from the manifold 3 and connect to fluid conduits extending through the core section stack 110 in order to transfer heat to or from the core section stack 110, as will be described in detail below. A similar manifold and similar feed lines are located on the opposing side of the core section stack 110 (not visible in FIG. 2) and are likewise connected to the other fluid coupling 6 and to the fluid conduits, so that the manifolds, feed lines, and fluid conduits together at least partially define the heat transfer fluid circuit 109.

A plurality of measurement apertures 7 are likewise provided in the baffle plate 2 and enable measurement probes (for example, thermocouples) to extend through the baffle plate 2 and into the core section stack 110 without interfering with the flow of fluid through the aperture 9. In this manner, the reactor core 1 can be installed into a reactor vessel so that all external connections for measurement probes and the heat transfer fluid circuit 109 can be made on a common side of the baffle plate opposite the reactor core stack 110.

Figure 2:
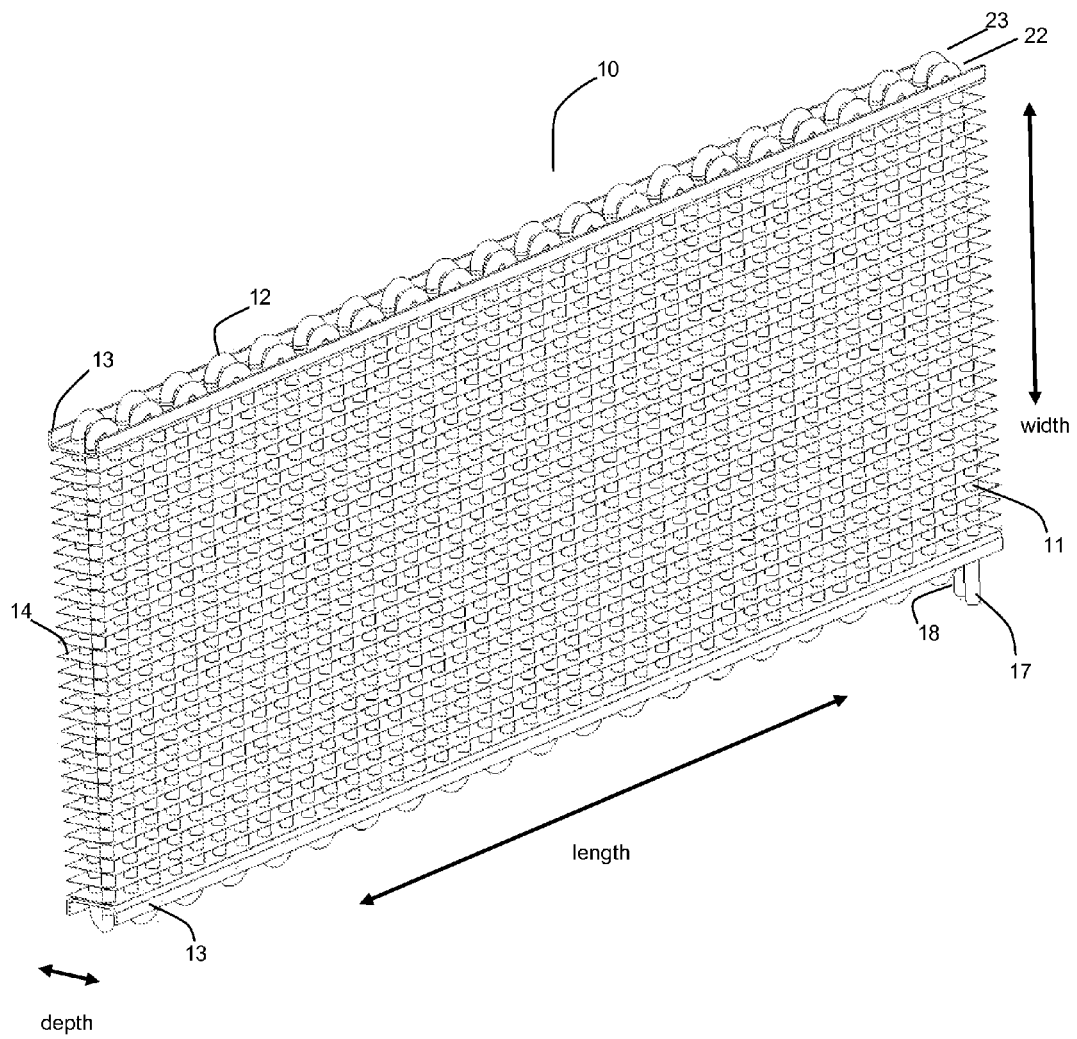
FIG. 2 is a perspective view of a reactor core section of the reactor core of FIG. 1.

Turning now to FIG. 2, the individual reactor core sections 10 will be described in greater detail. Each core section 10 is of a rectangular prismatic shape, having a length direction, a width direction, and a depth direction, as indicated in FIG. 2.

Tubular fluid conduits 11 are arranged to extend through the core section 10 in the width direction. The fluid conduits are aligned into two rows 22 and 23, with approximately half of the fluid conduits arranged in each of the rows 22, 23. The rows 22, 23 extend in the length direction and are offset from each other in the depth direction, thereby creating an evenly spaced array of the fluid conduits 11. An inlet end 17 is attached to an end of a conduit 11 in the row 22, and provides for fluid connection to one of the feeder tubes 5 to receive a flow of heat transfer fluid from the inlet manifold 3. Similarly, an outlet end 18 is attached to an end of a conduit 11 in the row 23, and likewise provides for fluid connection to one of the feeder tubes that connect to the outlet manifold. Turning fittings 12 are used to connect the ends of adjacent tubes at either end of the core section 10, so that the fluid conduits 11 are all connected in series with respect to the fluid flow therethrough, with a continuous path for the heat transfer fluid being provided between the inlet end 17 and the outlet end 18. In some embodiments the conduits 11 can be arranged in a single row, while in other embodiments the core section 10 can include three or more rows. The rows can be staggered, as shown in the exemplary embodiment or in line.

Figure 3:
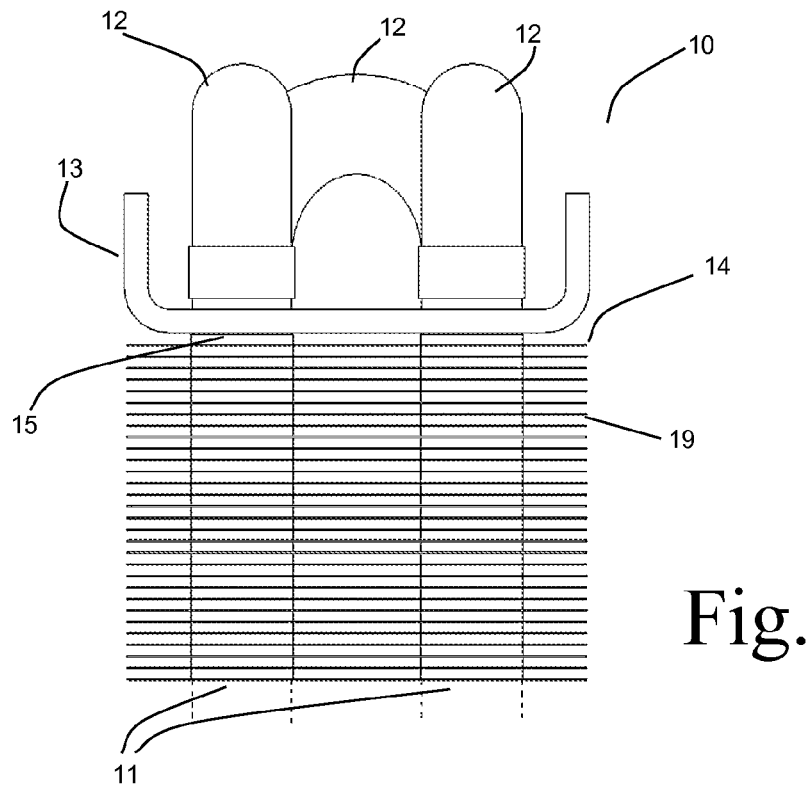
FIG. 3 is a partial elevation view of a portion of the reactor core section of FIG. 2.

Within the core section 10, multiple parallel flat plates 14 are arranged into a plate stack extending in the width direction. The plates 14 are thin, with a thickness that preferably ranges from 0.1 to 0.3 millimeters. Each of the plates 14 includes a pattern of holes, the holes being sized and spaced to allow the conduits 11 to extend through the holes. The holes in the plates 14 are preferably provided with flanges 15 (best seen in FIG. 3). The flanges 15 can be used to maintain the desired spacing between adjacent ones of the plates 14 and can provide surface area for bonding of the tubes 14 to the plates 15. The individual plates 14 can be flat as shown, or they can be provided with folds, corrugations, or other surface features.

The plates 14 are spaced apart from one another in the width direction of the core section so as to define channels 19 (FIG. 3) between adjacent plates. Exposed surfaces of each of the plates 14 are coated with a catalyst to promote desirable chemical reactions between the constituents of a gas flow that passes through the channels 19 and over the surfaces of the plates 14. The channels preferably extend through the full dimension of the core section 10 in both the depth direction and the length direction. In highly preferable embodiments the plates 14 are spaced apart so that the height of the channels 19 is in the range of 0.5 to 1.5 millimeters. Note that in some of the Figures (specifically, FIGS. 1, 2, 5, 6, 7) only every tenth plate 14 is shown for the sake of clarity.

In some highly preferable embodiments, the dimension of the core section 10 in the depth direction is substantially smaller than the dimensions of the core section 10 in both the width and the length direction. In the exemplary embodiment of FIG. 2, the core section 10 has a dimension of approximately one meter in the length direction, approximately 350 millimeters in the width direction, and approximately 44 millimeters in the depth direction. Preferably, the ratio of core section length to core section depth is at least 10:1, and even more preferably at least 20:1.

The core section 10 additionally includes side pieces 13 arranged at opposing side of the core section 10 in the core width direction. The side pieces 13 include a hole pattern corresponding to the hole pattern in the plates 14, so that the conduits 11 extend through the side pieces 13. The conduits 11 are preferably bonded to the plates 14 and the side pieces 13 in order to provide for good thermal contact between the conduits 11 and the plates 14, and to provide structural rigidity of the core section 10. Such bonding can be achieved by mechanical joining (e.g. by mechanical expansion of the conduits 11), by metallurgical joining (e.g. by brazing), or by other known methods.

In some embodiments, the conduits 11 are constructed of copper or a copper alloy and the plates 14 are constructed of aluminum or an aluminum alloy. In other embodiments the conduits 11 and the plates 14 are both constructed of aluminum or an aluminum alloy. In some such embodiments the conduits 11 and/or the plates 14 are provided with a braze cladding. Alternatively, the conduits 11 can be constructed of steel. The plates 14 can alternatively be constructed of a ferritic alloy containing some percentage of aluminum, for example the iron-chromium-aluminum alloy known as Fecralloy®.

The catalyst coating can preferably be applied to the exposed surfaces of the plates 14 after the components of the core section 10 have been assembled and joined. The methods for applying a catalyst coating to monolithic surfaces are known in the art, and generally include dispersing a catalyst (for example: precious metals such as Pt, Rh, Pd, Ru, Ir, Ag, Au; base metals such as Ni, Cu, Co; metal oxides such as $V_2O_5$) within a high surface area carrier and permanently affixing the carrier to the surfaces. The carrier is typically an inorganic material such as alumina ($Al_2O_3$) or silica ($SiO_2$) having a complex pore structure providing a large surface area for catalyst deposition. Alumina, for example, can be readily produced with an internal surface area density of 100-200 $m^2/g$. The carrier is impregnated with an aqueous solution containing a precursor of the catalyst, and is subsequently dried and calcined to fix the catalyst in the carrier pores. The prepared catalyzed carrier is milled down to a small particle size, and an aqueous slurry containing the catalyzed carrier is prepared.

The core section 10 is prepared for coating by heating in the presence of oxygen to form an oxide layer. The oxidized surfaces provide a roughened surface to improve the adhesion of the catalyzed carrier to the plates 14. The aqueous slurry is applied to the prepared surfaces, and the core section 10 is dried and calcined in order to securely bond the catalyzed carrier to the surfaces.

Applying the catalyst coating to the surfaces of the plates 14 is greatly simplified by limiting the dimension of the cores section 10 in the depth dimension as previously described. A wash coat can be evenly applied to the surfaces by, for example, dipping the core section 10 into a bath of the aqueous slurry, or pouring, spraying, or washing the aqueous slurry over the core section 10, preferably while oriented such that the depth direction is vertical. Excess slurry can be blown off of the surfaces using air. By virtue of the channels 19 extending in the relatively short depth direction, a uniform coating of catalyst can be applied to the plates 14 even when the channels 19 are of the aforementioned small dimension.

Figure 4:
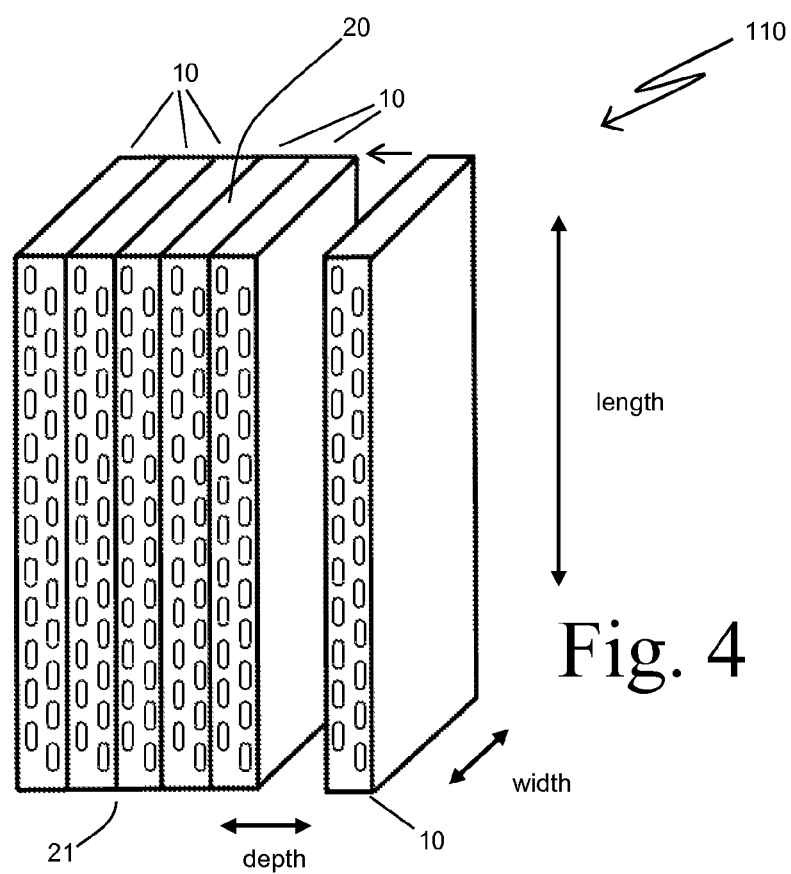
FIG. 4 is a diagrammatic perspective view of a reactor core section stack for use in the embodiment of FIG. 1.

Having been catalyst coated, the multiple core sections 10 can be assembled into the core section stack 110 by arranging the core sections 10 immediately adjacent to one another, as depicted in FIG. 4. In so doing, the core section stack 110 will be of a rectangular prismatic shape having dimensions in the length and width directions equal to that of each of the core sections 10, and a dimension in the depth direction equal to the sum of the dimensions in the depth direction of the individual core sections 10. The individual core sections 10 can be securely joined together by way of the side pieces 13, such as by welding or mechanical fasteners.

The core section stack 110 defines the face 20 at one end (in the length direction) of the core section stack 110, and an opposing face 21 at the opposing end (in the length direction) of the core section stack 110. The channels 19 between adjacent ones of the plates 14 provide flow channels extending over the length of the core section stack 110 between the face 20 and the face 21.

Figure 5:
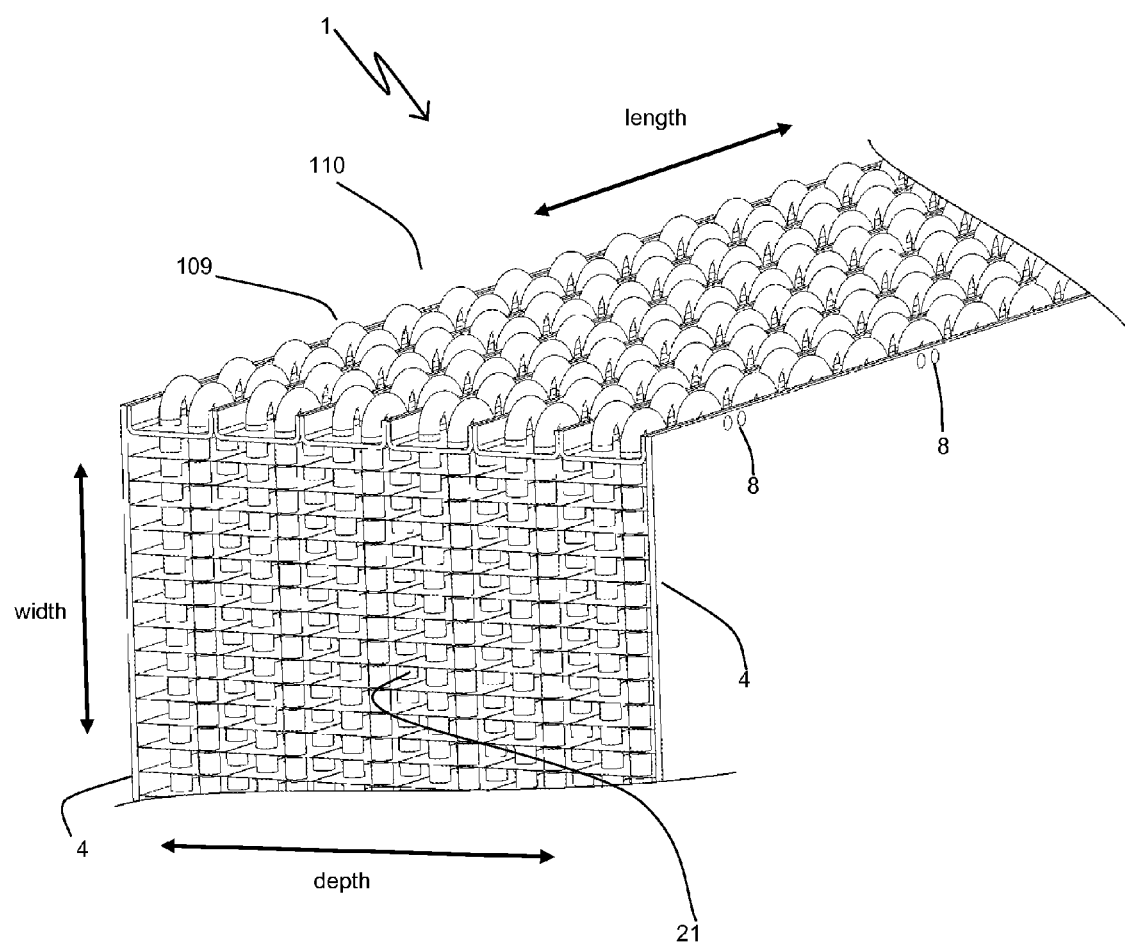
FIG. 5 is a partial perspective view of a portion of the reactor core of FIG. 1.
Figure 6:
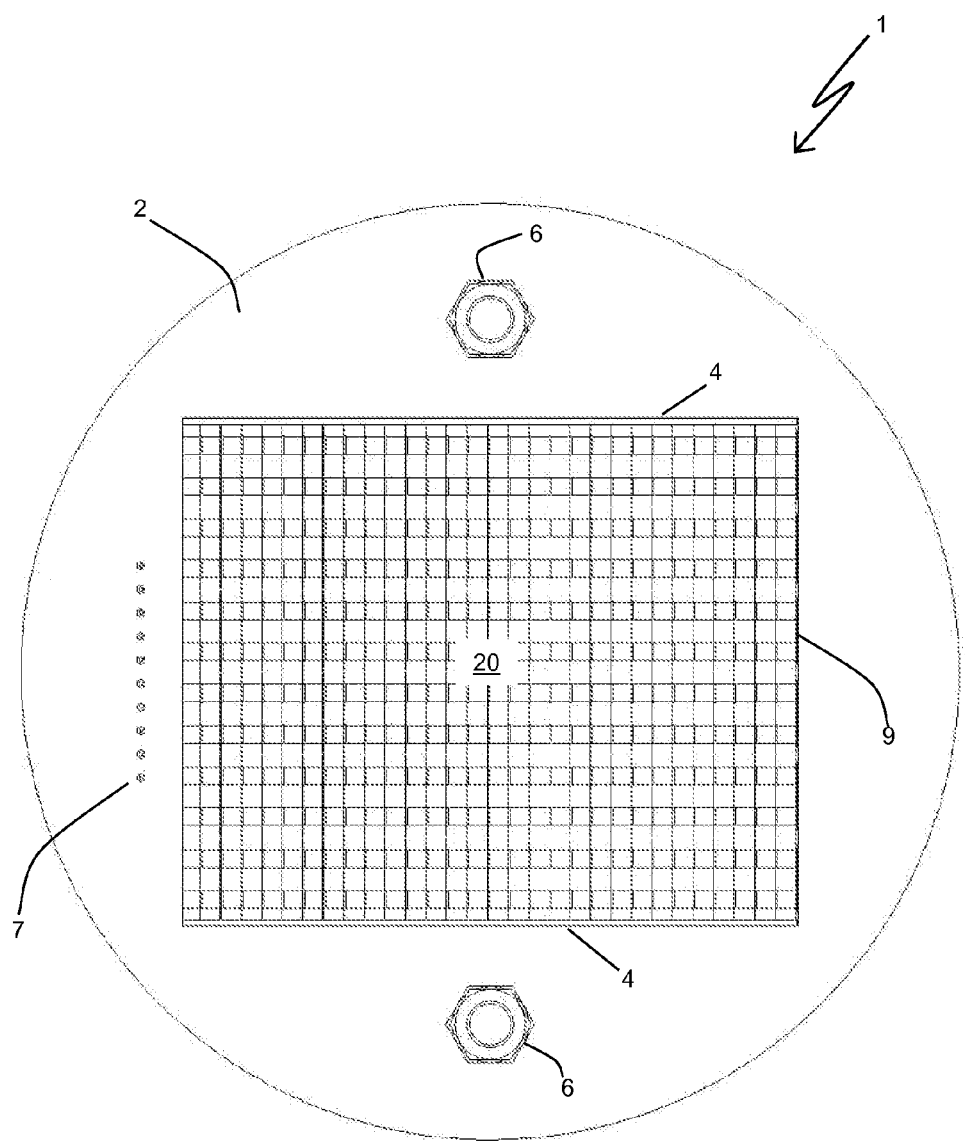
FIG. 6 is a plan view of the reactor core of FIG. 1.

Returning now to FIG. 1, with additional reference to FIGS. 5 and 6, further aspects of the reactor core 1 will be described. Opposing bounding plates 4 are provided at opposing ends of the core stack 110 in the depth direction, thereby preventing the leakage from the core stack 110 of fluid traveling through the channels 19 between the face 20 and the face 21. The bounding plates 4 can be attached to core section stack 110 by the outermost ones of the side pieces 13. As best seen in FIG. 5, this attachment can be realized using mechanical fasteners 8 (such as rivets, screws, and the like). Alternatively, this attachment can be realized using welding or similar methods when the materials of the side pieces 13 and the bounding plates 4 are compatible with such methods.

The bounding plates 4 can additionally be used to support the core section stack 110 from the baffle plate 2. Extensions of the bounding plates 4 can extend through the aperture 9 and can be affixed to the baffle plate 2 by welding or the like.

In the exemplary embodiment of FIG. 1, the number of feeder tubes 5 is equal to the number of core sections 10, and the heat transfer fluid circuiting through the heat transfer fluid circuit 109 is routed to each of the core sections 10 in parallel. In some alternative embodiments, two or more of the core sections can be plumbed in series with respect to the flow of heat transfer fluid, so that the inlet end 17 of one core section 10 is fluidly connected to the outlet end 18 of another core section 10, and the number of feed tubes 5 is reduced accordingly. Alternatively, the conduits 11 of a given core section 10 can be arranged into two or more parallel flowing groups of conduits 11, and the number of feed tubes 5 is increased accordingly.

Figure 7:
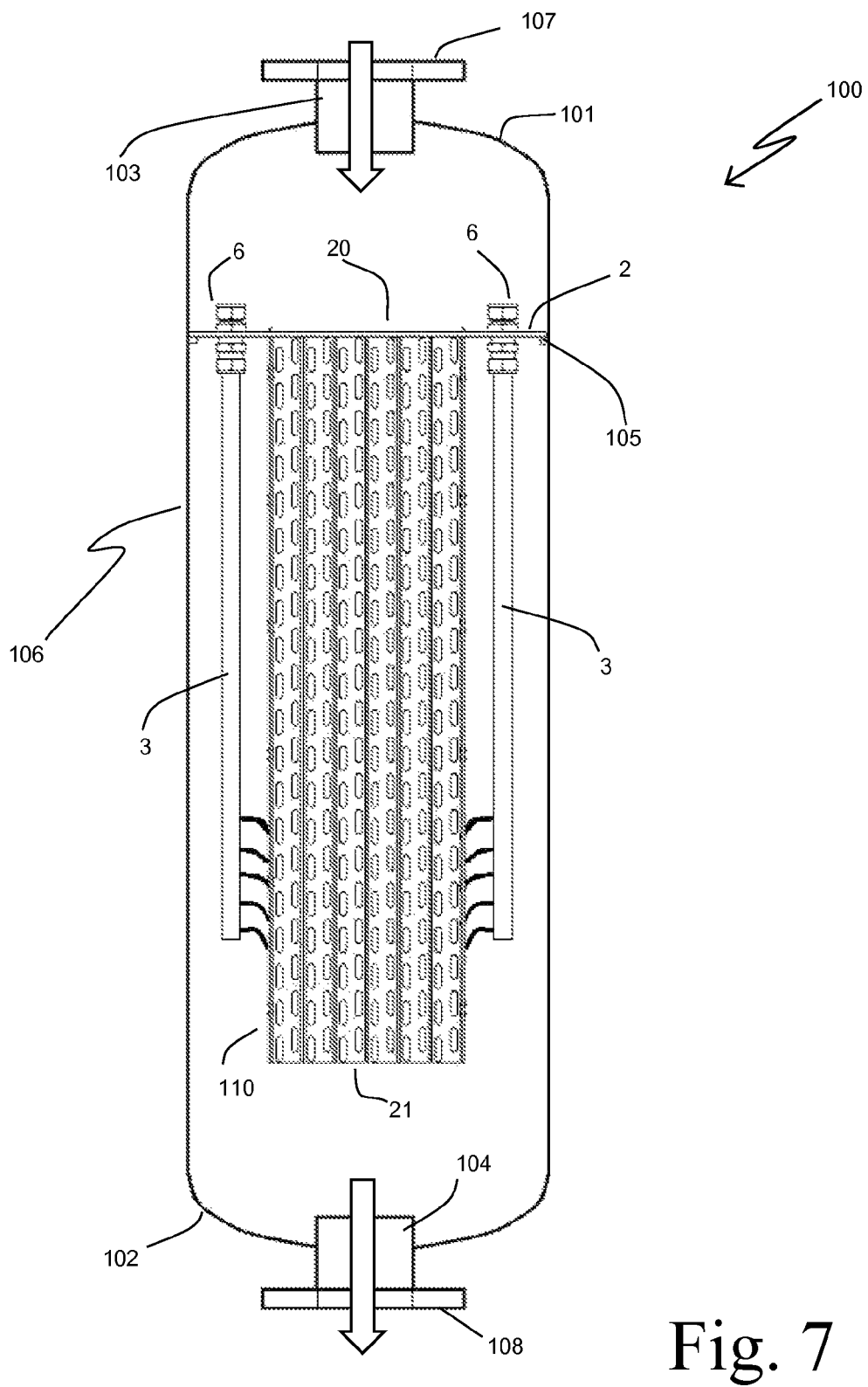
FIG. 7 is an elevation view of a chemical reactor including the reactor core of FIG. 1.

A chemical reactor 100 including the reactor core 1 is shown in FIG. 7. The chemical reactor 100 includes a cylindrical reactor vessel 106 having an internal diameter of substantially similar dimension as the diameter of the baffle plate 2 of the reactor core 1, so that the reactor core 1 can be installed inside the vessel 106 with minimal clearance around the baffle plate 2. A support ring 105 is provided interior to the vessel 106 structurally supports the baffle plate 2. A first vessel head 101 is provided at a first end of the vessel 106, and includes an inlet pipe 103 to allow for the introduction of a reactant flow into the chemical reactor 100. A flange 107 can be provided at the inlet pipe 103 to allow for the connection of flow piping to the inlet pipe 103. Similarly, a second vessel head 102 is provided at the opposing end of the vessel 106, and includes an outlet pipe 104 to allow for the removal of a product flow from the chemical reactor 100. A flange 108 can be provided at the outlet pipe 104 to allow for the connection of flow piping to the outlet pipe 104.

In some embodiments the chemical reactor 100 is operated in a vertical orientation so that the inlet pipe 103 is at a top end of the vessel 106, the outlet pipe 104 is at a bottom end of the vessel 106, and the reactor core 100 is oriented so that the channels 19 extend from the face 20 to the face 21 in a direction that is aligned with the force of gravity. Such an orientation is especially preferable in a gas-to-liquids reactor (e.g. a Fischer-Tropsch reactor) as the movement of the liquid product through the channels 19 is facilitated by the force of gravity. Such movement of the liquid product can further be aided by the continuous nature of the plates 14 between the face 20 and the face 21, as the liquid product can flow down the surfaces with minimal resistance.

Although not shown, fluid piping can extend into the chemical reactor 100 (such as through the wall of the vessel 106 or through the head 101, for example) and can connect to the fluid couplings 6 in order to route a heat transfer fluid through the heat transfer fluid circuit 109 of the reactor core 1. The heat transfer fluid can be liquid, vapor, or both. In some embodiments, the heat transfer fluid can enter the reactor 100 as a liquid and exit as a partially vaporized two-phase mixture of liquid and vapor. As an example, pressurized water can be used as the heat transfer fluid, with the pressure of the water selected so that the saturation temperature roughly corresponds with a desirable chemical reaction temperature for an exothermic reaction. The pressurized water can be partially vaporized as it passes through the heat transfer fluid circuit 109 by absorbing heat from the catalyzed plates 14, thereby maintaining the plates 14 at a desirable temperature.

In some embodiments, a chemical reactor 100 can include multiple reactor cores 1 arranged sequentially along the length of the vessel 106. Such a construction can allow for a chemical reactor 100 that is longer than the individual core sections 10, the practical length of which may be limited by manufacturing concerns.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

I claim:

1. A reactor core for use in a chemical reactor, the reactor core comprising:
   a first reactor core section and a second reactor core section, the first and second reactor core sections each comprising:
      a plurality of heat transfer fluid conduits extending through the reactor core section in a first direction, the lengths of the plurality of heat transfer fluid conduits defining a core section width;
      a plurality of spaced apart parallel plates arranged into a plate stack, the plurality of heat transfer fluid conduits extending through the plate stack, surfaces of the plates having a catalyst applied thereto, the plates each being of a rectangular shape and defining a core section depth in a second direction and a core section length in a third direction, the core section depth being substantially smaller than both the core section width and the core section length; and
      a plurality of channels defined by the spaces between adjacent ones of the plates, the plurality of channels being open to flow through the reactor core section in both the core section depth direction and the core section length direction;
   wherein the first reactor core section is arranged adjacent to the second reactor core section in the core section depth direction.

2. The reactor core of claim 1, wherein the plurality of heat transfer fluid conduits extending through the first core section is hydraulically in parallel with the plurality of heat transfer fluid conduits extending through the second core section.

3. The reactor core of claim 1, wherein the parallel plates include a plurality of flanged holes to receive the heat transfer fluid conduits therethrough, flanges of the flanged holes providing thermal contact between the fluid conduits and the plates.

4. The reactor core of claim 3, wherein said flanges define the spacing between the parallel plates.

5. The reactor core of claim 1, wherein the first reactor core section is one of a plurality of reactor core sections and the second reactor core section is another one of the plurality of reactor core sections, the plurality of reactor core sections being arranged in a core section stack extending in the core section depth direction.

6. The reactor core of claim 5, further comprising:
a first bounding plate arranged adjacent to an outermost one of the plurality of reactor core sections at a first end of the core section stack; and
a second bounding plate arranged adjacent to another outermost one of the plurality of reactor core sections at a second end of the core section stack.

7. The reactor core of claim 1, wherein the catalyst is a Fischer-Tropsch catalyst.

8. A reactor core for use in a chemical reactor, the reactor core comprising:
an inlet face to receive a reactant flow;
an exit face arranged parallel to the inlet face and spaced apart therefrom to discharge a product flow, the distance between the inlet face and the exit face defining a core flow length;
a plurality of spaced apart, parallel arranged plates extending from the inlet face to the exit face, surfaces of the plates having a catalyst applied thereto to promote chemical reaction in the reactant flow;
a heat transfer circuit comprising a plurality of heat transfer fluid conduits extending through the plurality of plates and in heat transfer contact therewith in order to facilitate the transfer of heat between the catalyzed surfaces and a fluid passing through the heat transfer circuit; and
a plurality of core sections arranged adjacent to one another in a reactor core depth direction perpendicular to the reactor core flow length.

9. The reactor core of claim 8, wherein the heat transfer fluid conduits extend in a reactor core width direction perpendicular to the reactor core depth direction.

10. The reactor core of claim 8, wherein the heat transfer circuit comprises a plurality of circuit segments arranged fluidly in parallel, each one of the plurality of core sections containing one of the plurality of circuit segments.

11. The reactor core of claim 8, further comprising a baffle plate arranged at the inlet face to direct the reactant flow through the inlet face.

12. The reactor core of claim 11, wherein the plates and the heat transfer circuit are structurally supported from the baffle plate.

13. A reactor core for use in a chemical reactor, the reactor core comprising:
a plurality of separate, adjacent reactor core sections extending in a core section depth direction;
an inlet face formed by the plurality of core sections;
an exit face formed by the plurality of core sections at an end of the reactor core opposite the inlet face; and
a flow direction from the inlet face through the reactor core to the exit face,
wherein each of the plurality of core sections includes:
a plurality of heat transfer fluid conduits extending in a first direction, the lengths of the plurality of heat transfer fluid conduits defining a core section width;
a plurality of spaced apart parallel plates arranged into a plate stack, the plurality of heat transfer fluid conduits extending through the plate stack, surfaces of the plates having a catalyst applied thereto, the plates each being of a rectangular shape and defining the core section depth in a second direction and a core section length in a third direction, the core section depth being substantially smaller than both the core section width and the core section length; and
a plurality of channels defined by spaces between adjacent ones of the plates, wherein the flow direction extends through the channels in the third direction.

14. The reactor core of claim 13, wherein the parallel plates include a plurality of flanged holes to receive the heat transfer fluid conduits therethrough, flanges of the flanged holes providing thermal contact between the fluid conduits and the plates.

15. The reactor core of claim 13, further comprising,
a first bounding plate arranged adjacent to an outermost one of the plurality of reactor core sections in the depth direction; and
a second bounding plate arranged adjacent to another outermost one of the plurality of reactor core sections in the depth direction opposite the first bounding plate.

16. The reactor core of claim 13, further comprising,
a first bounding plate arranged adjacent to an outermost one of the plurality of reactor core sections in the depth direction; and
a second bounding plate arranged adjacent to another outermost one of the plurality of reactor core sections in the depth direction opposite the first bounding plate, the first and second bounding plates being arranged perpendicular to the plurality of parallel plates.

17. The reactor core of claim 13, wherein the catalyst is a Fischer-Tropsch catalyst.

18. The reactor core of claim 13, each of the plurality of core sections further including two side pieces arranged at opposing sides of each core section and extending in the core depth and length directions, wherein the flow direction extends through the plurality of core sections in a length direction of the side pieces.

* * * * *